(12) United States Patent
Shimizu

(10) Patent No.: US 7,311,017 B2
(45) Date of Patent: Dec. 25, 2007

(54) LINK MECHANISM

(75) Inventor: Hiroyuki Shimizu, Okazaki (JP)

(73) Assignee: DENSO Corporation, Kariya (JP)

( * ) Notice: Subject to any disclaimer, the term of this patent is extended or adjusted under 35 U.S.C. 154(b) by 632 days.

(21) Appl. No.: 10/846,868

(22) Filed: May 14, 2004

(65) Prior Publication Data

US 2004/0226709 A1   Nov. 18, 2004

(30) Foreign Application Priority Data

May 16, 2003   (JP) .............................. 2003-138909

(51) Int. Cl.
*G05G 1/00*   (2006.01)
(52) U.S. Cl. ...................... 74/469; 74/483 R
(58) Field of Classification Search .................. 74/469, 74/470, 471 R, 479.01, 483 R
See application file for complete search history.

(56) References Cited

U.S. PATENT DOCUMENTS 6,138,749 A * 10/2000 Kawai et al. ............... 165/204
6,644,055 B2 * 11/2003 Ohta et al. .................. 62/228.5
6,942,564 B1 * 9/2005 Roland et al. ............... 454/156
7,036,333 B2 * 5/2006 Schurig et al. ............... 62/279
7,051,788 B2 * 5/2006 Crocker et al. ............... 165/42
7,137,445 B2 * 11/2006 Kushner et al. ............ 165/203

FOREIGN PATENT DOCUMENTS

JP   63-297854   12/1988

* cited by examiner

*Primary Examiner*—David M. Fenstermacher
(74) *Attorney, Agent, or Firm*—Harness, Dickey & Pierce, PLC

(57) ABSTRACT

A link mechanism prevents a first pin from coming out of a groove and prevents interference with other elements. The line of action is the line orthogonal to the center line of the grooved portion and passes through the center of the first pin when the first pin is located at the open end of the grooved portion. A reference line passes through the swinging center of the first link lever and the center of the first pin. The angle between the line of action and the reference line is larger than 0°. The force that raises the pressure at the contact surface between the second pin and the cam surface acts upon the first pin from the grooved portion when the first pin is located at the open end of the grooved portion. The link mechanism is operational without the cam grooved wall in the entire cam surface region.

8 Claims, 6 Drawing Sheets

LINK MECHANISM

CROSS REFERENCE TO RELATED APPLICATIONS

This application is based upon, claims the benefit of priority of, and incorporates by reference Japanese Patent Application No. 2003-138909 filed May 16, 2003.

BACKGROUND OF THE INVENTION

1. Field of the Invention

The present invention relates to a link mechanism and is applicable to a blowing mode switching device in a vehicle air-conditioning apparatus.

2. Description of the Related Art

In a conventional vehicle air-conditioning apparatus, a door (damper) means is operated to control the conditioned air flow through a link mechanism including a plurality of link levers (see for example Japanese Patent Laid-Open Publication No. Sho 63-297854).

FIG. 6 is a view of a test model link mechanism developed by the inventor. In the link mechanism, a grooved portion 22a provided at a second link lever 22 is open at an end and a cam 23 in contact with the second pin 21b of a first link lever 21 is not provided with a guide wall to restrict the first link lever 21 from swinging in such a direction that the second pin 21b moves away from the cam surface 23a of the cam 23. Therefore, when the first link lever 21 rotates excessively to the left (counter-clockwise), the first pin 21a of the first link lever 21 could come out of the grooved portion 22a.

The disadvantage may be solved by forming the grooved portion of the second link lever 22 into a closed shape or providing the guide wall to the cam 23. However, if the grooved portion 22a has a closed end, the second link lever 22 can be increased in size, while the guide wall provided at the cam 23 may interfere with other elements.

SUMMARY OF THE INVENTION

The invention is directed to solving the above disadvantage. It is a first object of the present invention to provide a novel link mechanism different from the conventional mechanism, and a second object is to prevent the first pin from coming off of the groove while preventing the second lever from increasing in size and interfering with other elements.

In order to achieve the above described objects, the mechanism according to a first aspect of the invention includes a first link lever (21), a second link lever (22), and a cam (23). The first link lever (21) is rotatably supported at a longitudinal intermediate part thereof to enable it to swing. The first link lever (21) has a first pin (21a) provided at one end thereof in a longitudinal direction and a second pin (21b) provided at the other end thereof. The second link lever (22) has a grooved portion (22a) into which the first pin (21a) of the first link lever (21) is slidably inserted. The cam (23) has a cam surface (23a) at its outer peripheral surface. The second pin (21b) of the first link lever (21) slidably contacts with the cam surface (23a). The grooved portion (22a) is open at an end thereof, and when the first pin (21a) is located at the open end of the grooved portion (22a), force in the direction to raise the pressure at the contact surface between the second pin (21b) and the cam surface (23a) acts upon the first pin (21a) from the grooved portion (22a).

In this way, the first link lever (21) can be prevented from excessively swinging which may cause the first pin (21a) to come out of the grooved portion (22a) during the operation of the link mechanism. Therefore, the link mechanism can normally be operated while preventing the second link lever (22) from increasing in size and interfering with other elements.

According to a second aspect of the invention, at an outer periphery of the cam (23), a cam grooved wall (23b) is provided opposing the cam surface (23a) and at a prescribed space apart from a part of the cam surface (23a). At the end of the cam grooved wall (23b) in the sliding direction of the second pin (21b), there is a taper portion (23c) so that the cam grooved wall (23b) is thinner toward the end.

In this way, when the second pin (21b) comes into the cam surface (23a) provided with the cam grooved wall (23b) and thus having a grooved shape from the part without the cam grooved wall (23b), the taper portion (23c) serves as a guide face to allow the second pin (21b) to easily come into the grooved cam surface (23a).

According to a third aspect of the invention, a stopper portion (2a) is provided at a base portion (2) supporting the first link lever (21). The stopper portion (2a) strikes against at least a part of the first link lever (21) to limit the maximum swinging angle of the first link lever (21).

In this way, the first link lever (21) can be prevented from excessively rotating to cause the first pin (21a) to come out of the grooved portion (22a), and at the time of repairing/replacing the link mechanism, the first link lever (21) can be prevented from coming completely off of the second link lever (22), i.e., the grooved portion (22a), so that repair and replacement can be improved.

According to a fourth aspect of the invention, the mechanism includes a first link lever (21), a second link lever (22), and a cam (23). The first link lever (21) is rotatably supported at the longitudinal intermediate part to swing. The first link lever (21) has a first pin (21a) provided at one end thereof in a longitudinal direction and a second pin (21b) provided at the other end thereof. The second link lever (22) has a grooved portion (22a) into which the first pin (21a) of the first link lever (21) is slidably inserted. The cam (23) has a cam surface (23a) at its outer peripheral surface. The second pin (21b) of the first link lever (21) slidably contacts with the cam surface (23a). An end of the grooved portion (22a) is open, and a stopper portion (2a) that collides against at least a part of the first link lever (21) to restrict the maximum swinging angle of the first link lever (21) is provided at a base portion (2) supporting the first link lever (21).

In this way, the first link lever (21) can be prevented from excessively rotating which may cause the first pin (21a) to come out of the grooved portion (22a), so that the link mechanism can normally be operated without increasing the size of the second link lever (22) and potentially cause interference with other elements.

According to a fifth aspect of the invention, a longitudinal end of the second link lever (22) opposite to the open end of the grooved portion (22a) is rotatably supported at the base portion (2).

According to a sixth aspect of the invention, a fluid flow control device includes the link mechanism (20) as recited in any one of the first to fifth aspects, a door means (17), and an actuator (19). The door means (17) is coupled to the second link lever (22) to control the flow of fluid, and the actuator (19) drives the cam (23) to rotate it.

According to a seventh aspect of the invention, a vehicle air-conditioning apparatus includes the link mechanism (20), as recited in any one of the first to fifth aspects, a door means (17), and an actuator (19). The door means (17) is coupled to the second link lever (22) to control the air flow blown into a compartment, and the actuator (19) drives the cam (23) to rotate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
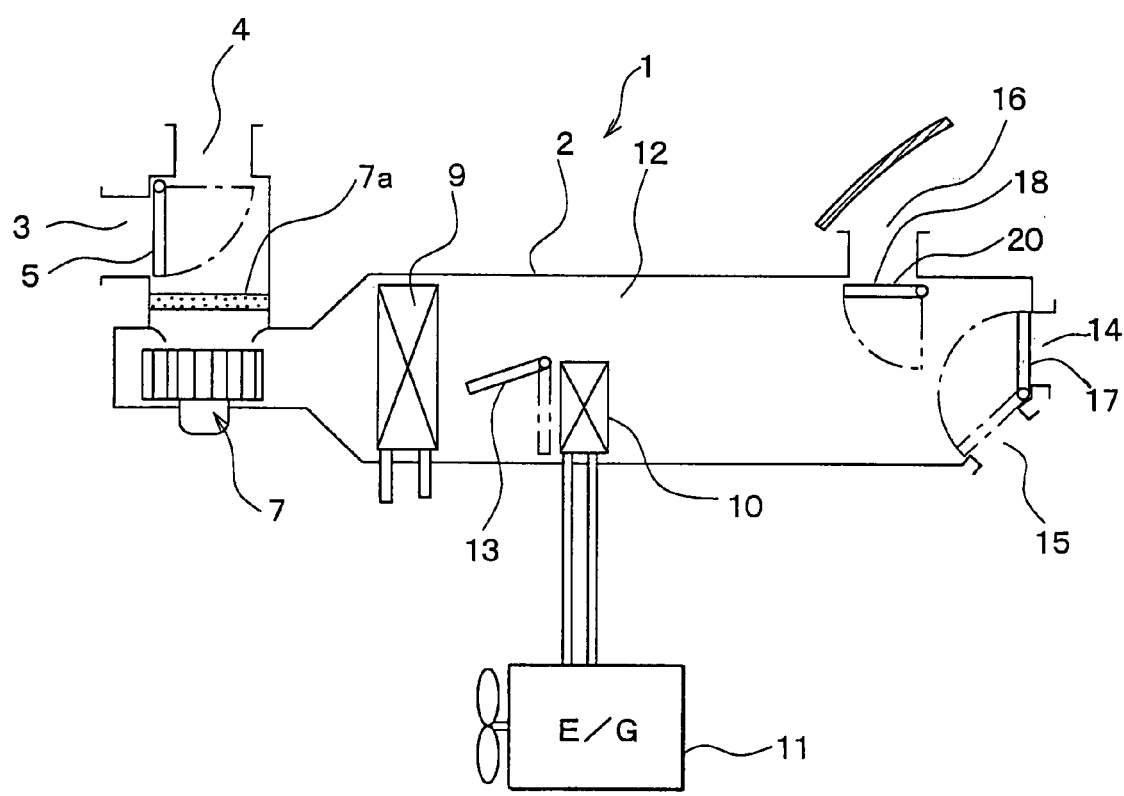
FIG. 1 is a schematic view of an air-conditioning apparatus according to an embodiment of the invention.

According to an embodiment, the invention is applied to a link mechanism that drives a blowing mode switching door in a vehicle air-conditioning apparatus. FIG. 1 is a general schematic view of the vehicle air-conditioning apparatus 1 according to the embodiment. Note that the shapes in the schematic illustration in FIG. 1 may be slightly different from actual shapes.

There is an inside air inlet 3 to let inside air come into the compartment and an outside air inlet 4 to let in outside air at the upstream side of an air-conditioning casing 2, which forms an air flow path. There is also an inside/outside air switching door 5 that selectively opens and closes these inlets 3 and 4. The inside/outside air switching door 5 is opened/closed by a driving means such as a servo motor or by manual operation.

A filter (foreign matter removing means) 7a and a blower 7 that remove dust from the air are provided on the downstream side of the inside/outside air switching door 5. The air from the blower 7 is let into the inlets 3, 4 and directed to flow toward blowing outlets 14 to 16 that will be described. An evaporator 9 serving as an air cooling means is provided on the downstream side of the blower 7, and air from the blower 7 is entirely passed through the evaporator 9.

Note that the evaporator 9 is a low pressure side heat exchanger in a vapor compression refrigerator. Heat-exchanges between decompressed low pressure refrigerant and air coming into the compartment. In this way, the air blown into the compartment has its heat absorbed so that the refrigerant evaporates and the air is cooled. A heater 10 that serves as an air heating means is provided on the downstream side of the evaporator 9. The heater 10 heats the air from the engine cooling water as a heat source. The heat from the engine cooling water is otherwise waste heat generated in the vehicle.

The air-conditioning casing 2 has a bypass 12 to let cool air passed through the evaporator 9 bypass the heater 10 and flow toward the downstream side. On the air upstream side of the heater 10, there is an air mix door 13 that adjusts the ratio of the quantity of warm air through the heater 10 and the quantity of cool air through the bypass 12. In this way, the temperature of the air blown into the compartment is controlled by adjusting the air quantity ratio of the warm air and the cool air.

On the lowermost downstream side of the air-conditioning casing 2, there is a face blow-off opening 14 from which conditioned air is directed to the upper half of a passenger body in the compartment, a foot blow-off opening 15 from which air is directed to the foot, and a defroster blow-off opening 16 from which air is blown toward the inner surface of the window glass such as the front windshield.

On the upstream side of the vent openings 14 to 16, there is a blowing mode switching door 17 that switchably opens/closes the face vent opening 14 and the foot vent opening 15 and a blowing mode switching door 18 that opens/closes the defroster vent opening 16. Note that these blowing mode switching doors 17, 18 are opened/closed by an actuator 19, such as a servo motor (see FIG. 2).

According to the embodiment, the invention is applied to the link mechanism 20 that drives the blowing mode switching door 17. Now, the link mechanism 20 will be described in conjunction with FIGS. 2 to 5.

Figure 2:
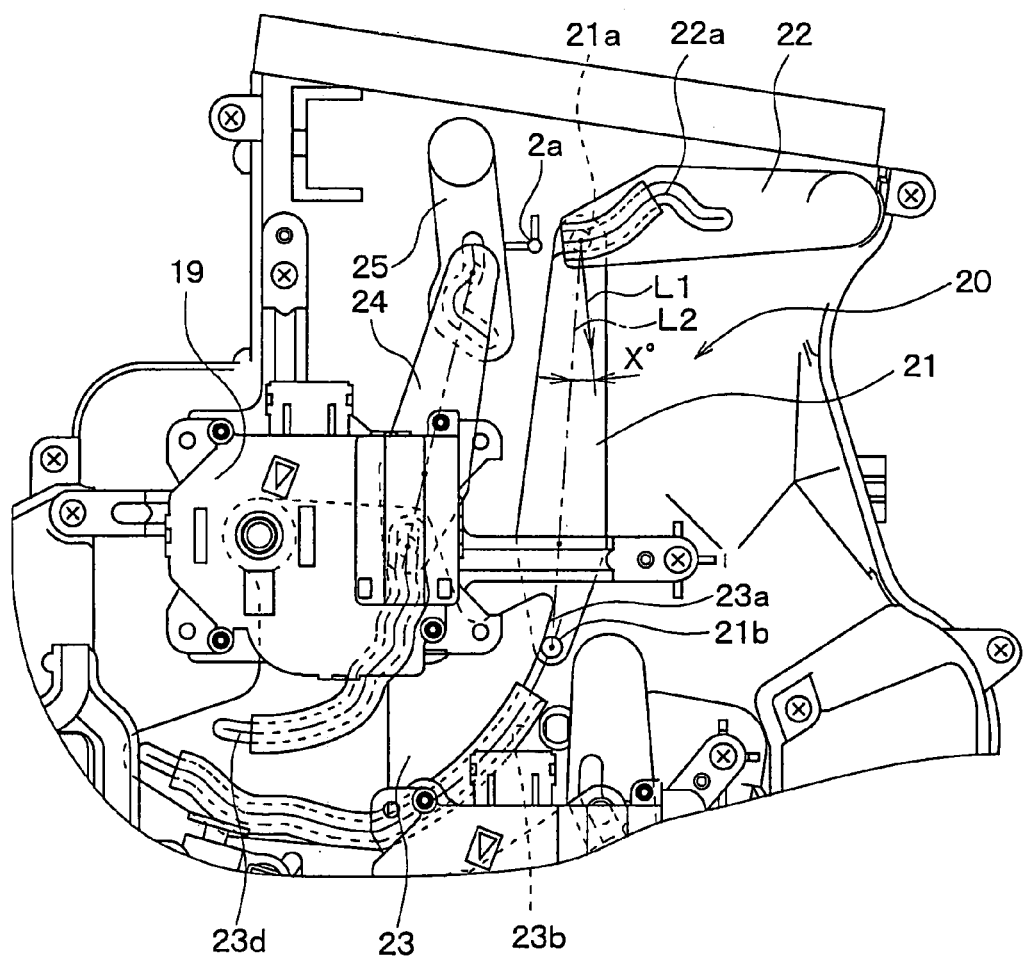
FIG. 2 is a schematic view of a link mechanism according to the embodiment of the invention.
Figure 3:
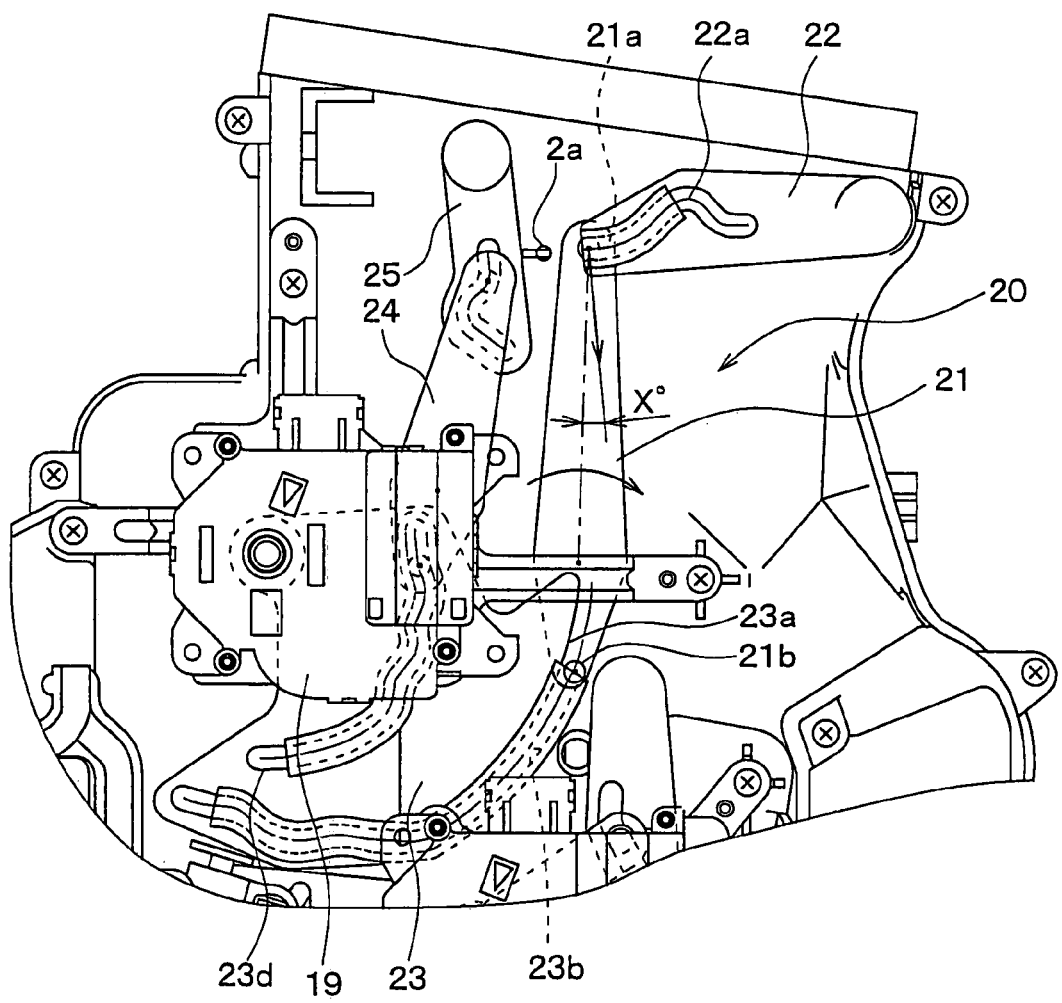
FIG. 3 is a schematic view of a link mechanism according to the embodiment of the invention.
Figure 4:
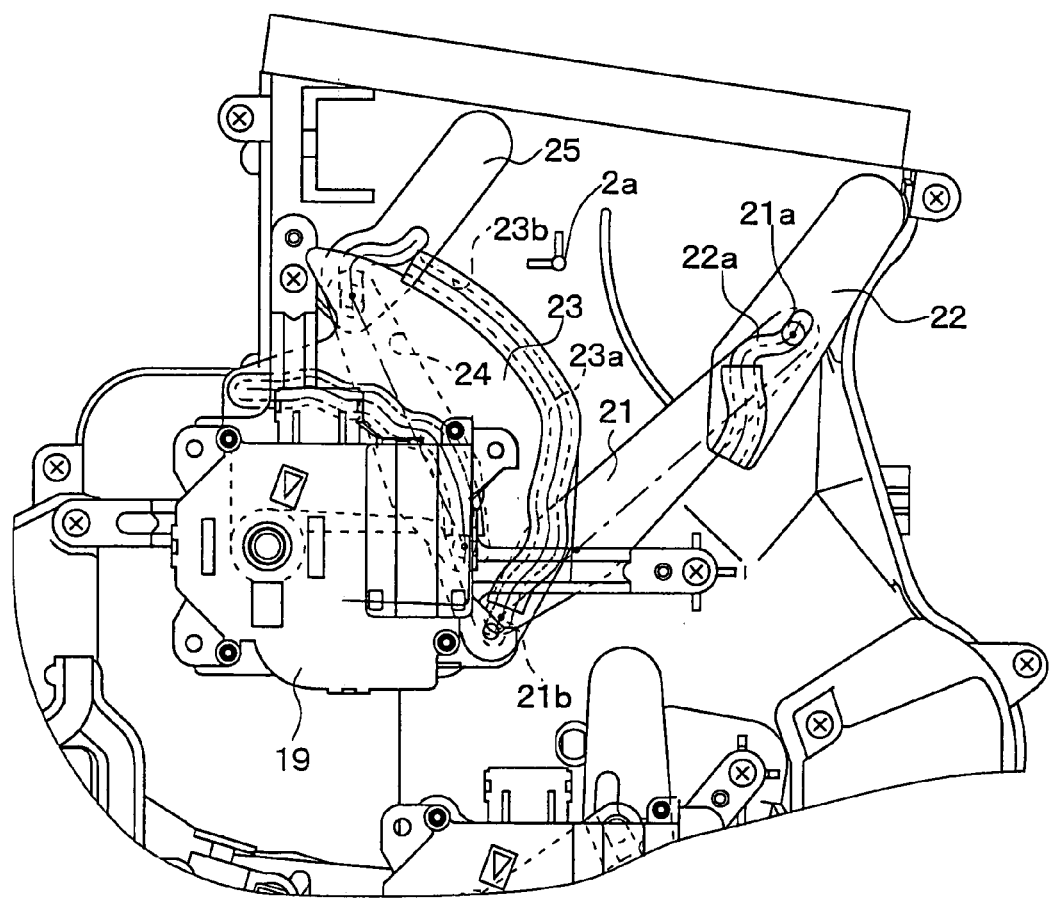
FIG. 4 is a schematic view of a link mechanism according to the embodiment of the invention.

Note that FIGS. 2 to 4 show how the link mechanism 20 operates and the operation state of the link mechanism changes from FIG. 2 to FIG. 3 and to FIG. 4, or from FIG. 4 to FIG. 3 and to FIG. 2. FIG. 5 is a view showing how the first link lever 21, the second link lever 22, and the cam 23 are coupled.

In FIG. 2, the first link lever 21 is rotatably supported at the longitudinal intermediate part thereof by the air-conditioning casing 2 and swings. The air-conditioning casing 2 serves as a base portion. The second link lever 22 has a grooved portion 22a at one end in the longitudinal direction. A first pin 21a provided at one end of the first link lever 21 in the longitudinal direction is slidably inserted to the grooved portion 22a.

Herein, the expression "longitudinal intermediate part of the first link lever 21" does not strictly refer to the exact longitudinal center of the first link lever 21 but suggests that the center of swinging is located between the longitudinal ends. It is also understood that the distance from the center of swinging to one end in the longitudinal direction may be equal to the distance from the center of swinging to the other end.

Note that the second link lever 22 has a longitudinal end fixed to the rotating shaft of the blowing mode switching door 17, and the second link lever 22 and the blowing mode switching door 17 swing integrally around the rotating shaft of the blowing mode switching door 17.

The cam 23 has a cam surface 23a at the outer peripheral surface. A second pin 21b provided on the other longitudinal end of the link lever 21 slidably contacts with the cam surface 23a. As shown in FIGS. 2 to 4, the second pin 21b slides around the outer periphery of the cam 23 along the cam surface 23a.

Figure 5A:
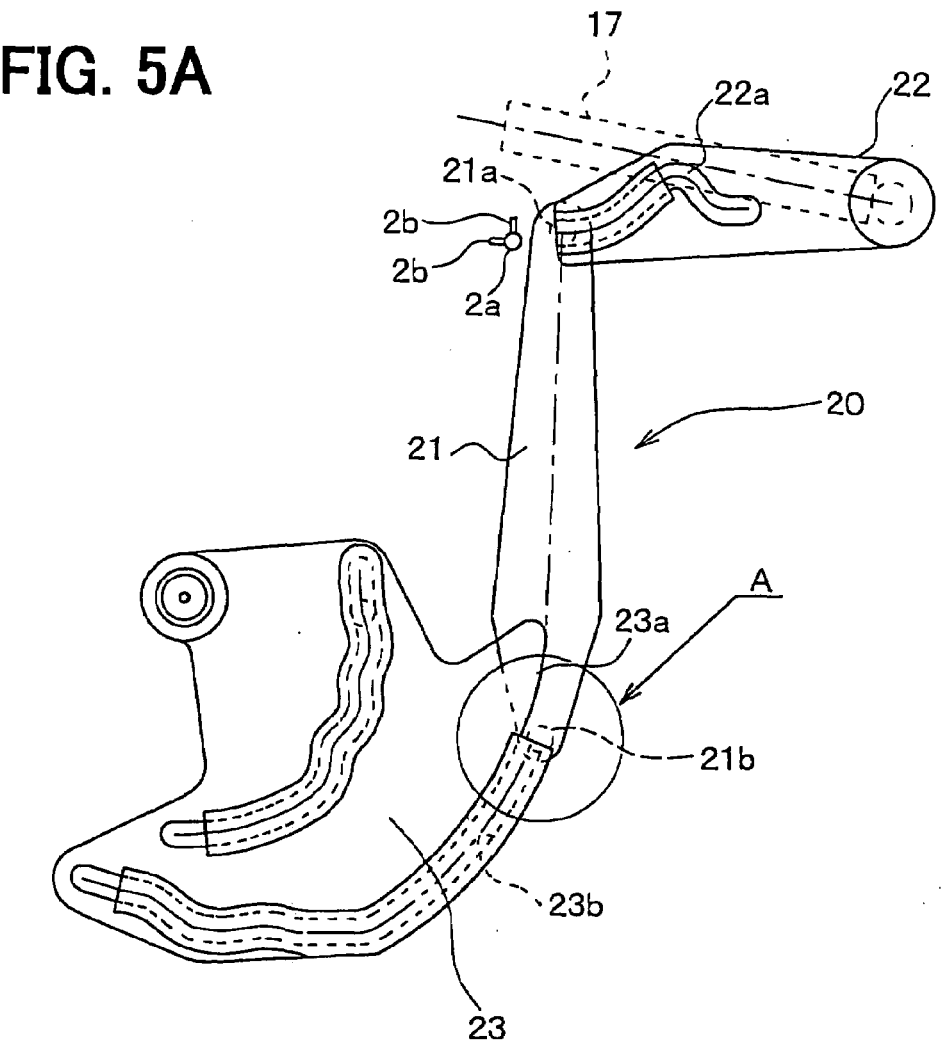
FIG. 5A is a schematic view of a link mechanism according to the embodiment of the invention.
Figure 5B:
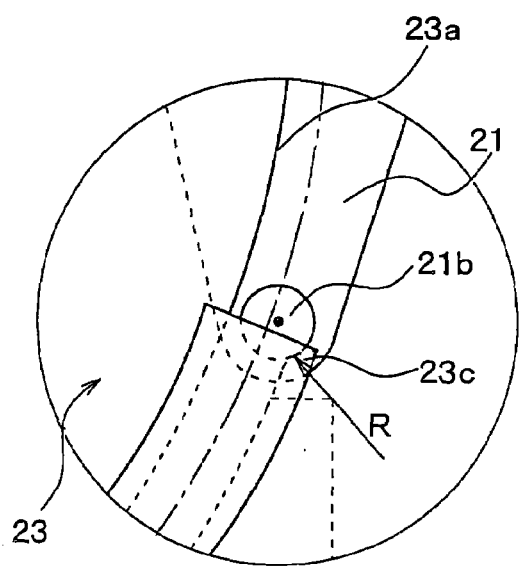
FIG. 5B is an enlarged view of a portion of the link mechanism of FIG. 5A.

As shown in FIG. 5A, at the outer periphery of the cam 23, a cam grooved wall 23b is provided. The wall opposes the cam surface 23a and is a prescribed distance apart from a part of the cam surface 23a to form a guide wall. As shown in FIG. 5B, the end of the cam grooved wall 23b in the sliding direction of the second pin 21b has a taper portion 23c so that the cam grooved wall 23b is thinner toward the end. Note that according to the embodiment, the taper portion 23c is mildly circular, but the embodiment is not limited to the shape, and for example, a linear taper may be employed.

The air-conditioning casing 2 is provided with a stopper portion 2a that strikes against at least a part of the first link lever 21 and restricts the maximum swinging angle of the first link lever 21. According to the embodiment, the air-conditioning casing 2 is made of resin (such as polypropylene) and the stopper portion 2a is integrally formed with the air-conditioning casing 2 when the casing is formed. A reinforcement rib 2b is provided at the root side of the stopper portion 2a and prevents the stopper portion 2a from being broken when the first link lever 21 collides against the stopper 2a.

The grooved portion 22a of the second link lever 22 has an open end on the side of the first link lever 21. The shape of the grooved portion 22a and the locations of the swinging centers of the first and second link levers 21 and 22 are arranged so that the force that raises the pressure at the contact surface between the second pin 21b and the cam surface 23a acts upon the first pin 21a from the grooved portion 22a when the first pin 21a is located at the open end of the grooved portion 22a.

More specifically, referring to FIGS. 2 and 3, the line of action L1 is the normal line orthogonal to the center line of the grooved portion 22a and passes through the center of the first pin 21a when the first pin 21a is located at the open end of the grooved portion 22a. A reference line L2 passes through the swinging center of the first link lever 21 and the center of the first pin 21a. The angle X between the lines L1 and L2 is larger than 0°.

Figure 6:
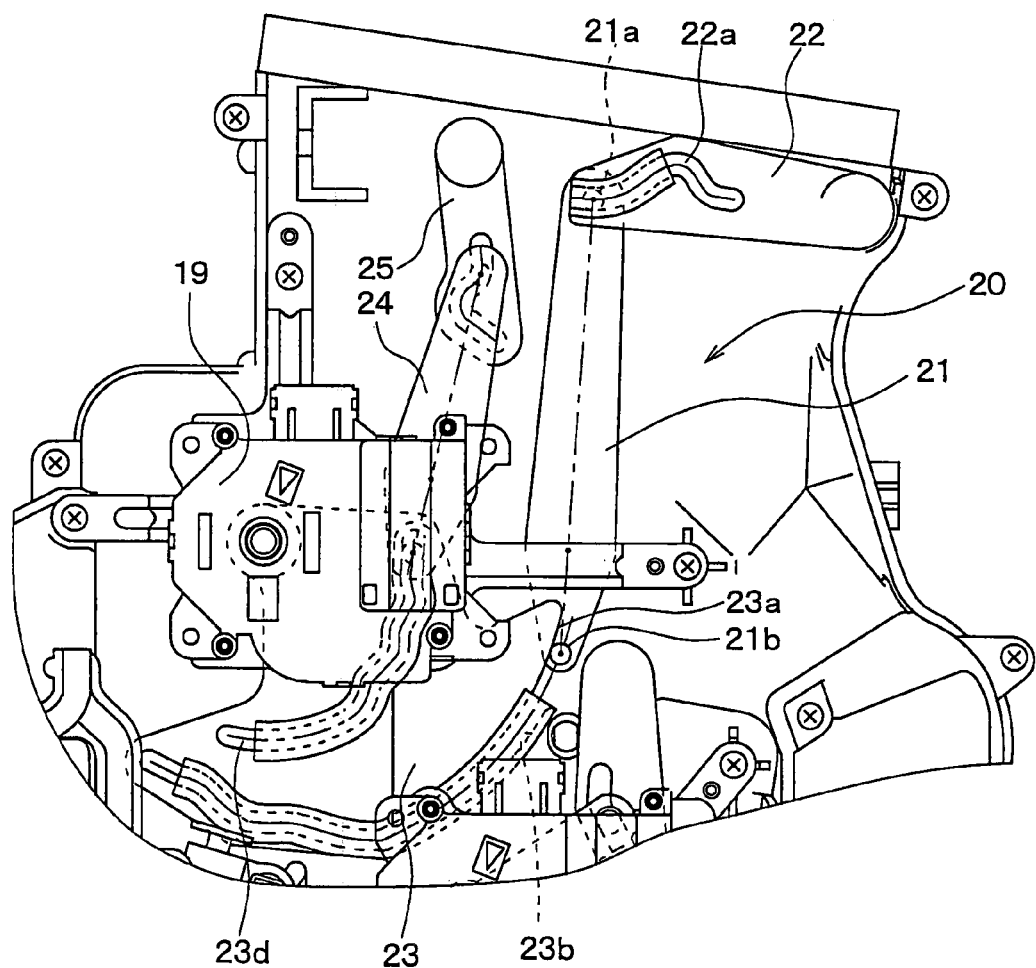
FIG. 6 is a schematic view of a related art test model link mechanism.

In the test model, the line of action L1 is in coincidence with the reference line L2, and the angle between the lines L1 and L2 is 0° (see FIG. 6). Note that the source of the force that raises the contact surface pressure between the second pin 21b and the cam surface 23a is a reaction force from a packing sealing the gap between the blowing mode switching door 17 and the air-conditioning casing 2.

Furthermore, when the first pin is located at the open end of the grooved portion, the second link lever is in a position to press the blowing mode door against the air-conditioning casing, that is, in a position on one end side in the pivotal range. At that time, the reaction force from the packing sealing between the blowing mode door and the air-conditioning casing is transmitted to the first pin through the second link lever. The reaction force transmitted to the first pin acts in the direction of the normal line (line of action L1) orthogonal to the center line of the grooved portion when the first pin is located at the open end of the grooved portion, and the force applies a clock-wise moment to the first link lever. This raises the contact surface pressure between the second pin and the cam surface.

A cam grooved portion 23d is provided to move the blowing mode switching door 18. The movement of the cam grooved portion 23d is transmitted to the blowing mode switching door 18 through third and forth link levers 24 and 25.

Now, the operation of the link mechanism 20, that is, the first and second link levers 21, 22 and the cam 23 and their characteristics will be described. The cam 23 is directly driven by the actuator 19 to rotate, and the second pin 21b moves along the cam surface 23a. Therefore, as the first link lever 21 swings as shown in FIGS. 2 to 4, and the second link lever 22 swings in a synchronized manner, the blowing mode switching door 17 swings accordingly.

The shape of the grooved portion 22a and the locations of the swinging centers of the first and second link levers 21, 22 are arranged so that the force that raises the pressure at the contact surface between the second pin 21b and the cam surface 23a acts in the direction from the grooved portion 22a to the first pin 21a when the first pin 21a is located at the open end of the grooved portion 22a. Therefore, the first link member 21 is prevented from swinging excessively to the left to cause the first pin 21a to come out of the grooved portion 22a during the operation of the link mechanism 20.

The link mechanism 20 can normally be operated without providing the cam grooved wall 23b in the entire region of the cam surface 23a or forming the ends of the grooved portion 22a in a closed shape. Therefore, the link mechanism 20 can normally be operated without increasing the size of the second link lever 22 and causing interference between the cam grooved wall 23b and other elements.

In addition, the end of the cam grooved wall 23b is provided with the taper portion 23c, and therefore when the second pin 21b enters from the location without the cam grooved wall 23b to the grooved cam surface 23a provided with the cam grooved wall 23b, the taper portion 23c serves as a guide face. Therefore, the second pin 21b can easily enter the grooved cam surface 23a.

The stopper portion 2a can prevent the first link lever 21 from rotating excessively to cause the first pin 21a to come out of the grooved portion 22a. When the actuator 19 is detached from the air-conditioning casing 2 for repairing/replacing the link mechanism 20, the first link lever 21 can be prevented from completely coming away from the second link lever 22 (from the grooved portion 22a), so that the operability at the time of such repair/replacement can be improved.

Other Embodiments

In the above-described embodiment, the link mechanism is applied to the vehicle air-conditioning apparatus, but the invention is not limited to this. Also in the above-described embodiment, the invention is applied to the driving of the blowing mode switching door 17, but the application of the invention is not limited to such.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle air conditioning link mechanism comprising:
a first link lever which is rotatably supported at a longitudinal intermediate part thereof to enable the first link lever to swing, the first link lever having a first pin provided at one end thereof in a longitudinal direction and a second pin provided at the other end thereof;
a second link lever defining a grooved portion into which the first pin is slidably inserted; and
a cam having a cam surface at its outer peripheral surface, with which the second pin slidably contacts, wherein
the grooved portion is open at an end thereof, and
when the first pin is located at the open end of the grooved portion, force in a direction to raise a pressure at a contact surface between the second pin and the cam surface acts upon the first pin from the grooved portion.

2. The link mechanism according to claim 1, wherein
a cam grooved wall is provided at an outer periphery of the cam opposing the cam surface and a prescribed space apart from a part of the cam surface, and
a taper portion is provided at the end of the cam grooved wall in the sliding direction of the second pin, so that the cam grooved wall becomes increasingly thinner.

3. The link mechanism according to claim 1, wherein
a stopper portion is provided at a base portion supporting the first link lever, so that the stopper portion strikes against at least a part of the first link lever to restrict a maximum swinging angle of the first link lever.

4. A vehicle air conditioning link mechanism comprising:
a first link lever which is rotatably supported at a longitudinal intermediate part thereof to enable the first link lever to swing, the first link lever having a first pin provided at a first end thereof in a longitudinal direction and a second pin provided at a second end thereof;
a second link lever defining a grooved portion into which the first pin is slidably inserted; and
a cam having a cam surface at its outer peripheral surface, with which the second pin slidably contacts, wherein the grooved portion is open at an end thereof, and
a stopper portion that collides against at least a part of the first link lever to restrict a maximum swinging angle of the first link lever provided at a base portion supporting the first link lever.

5. The link mechanism according to claim 3, wherein
a longitudinal end of the second link lever opposite to the open end of the grooved portion is rotatably supported at the base portion.

6. The link mechanism according to claim 1, wherein when the first pin is located at the open end of the grooved portion, an angle, between a normal line orthogonal to a center line of the grooved portion, and a reference line passing through the center of the first link lever and the first link pin, is larger than 0°.

7. The link mechanism according to claim 1, wherein when one pin is located at the open end of the grooved portion, the second link lever is located at one end side of the first link lever and in a pivotal range of the second link lever.

8. The link mechanism according to claim 1, further comprising:
a door coupled to the second link lever to control fluid flow; and
an actuator that rotates the cam.

* * * * *